United States Patent [19]

Kress et al.

[11] Patent Number: 4,954,024
[45] Date of Patent: Sep. 4, 1990

[54] PRECISION BORING TOOL

[75] Inventors: Dieter Kress, Aalen; Friedrich Häberle, Lauchheim, both of Fed. Rep. of Germany

[73] Assignee: Mapal Fabrik Fur Prazisionswerkzeuge Dr. Kress KG, Fed. Rep. of Germany

[21] Appl. No.: 281,089

[22] Filed: Dec. 7, 1988

[30] Foreign Application Priority Data

Dec. 7, 1987 [DE] Fed. Rep. of Germany ....... 3741332
Dec. 17, 1987 [DE] Fed. Rep. of Germany ....... 3742740

[51] Int. Cl.⁵ .............................................. B23B 51/00
[52] U.S. Cl. ...................................... 408/153; 407/40;
407/108; 408/179; 408/185; 408/197; 408/713
[58] Field of Search .............. 408/153, 179, 181, 197,
408/713, 185, 231–233; 407/40, 107, 112

[56] References Cited

U.S. PATENT DOCUMENTS

| | | | |
|---|---|---|---|
| 4,092,082 | 5/1978 | Severson | 407/40 |
| 4,163,624 | 8/1979 | Eckle | 407/43 X |
| 4,279,550 | 7/1981 | Kress et al. | 408/153 X |
| 4,462,725 | 7/1984 | Satran et al. | 407/108 X |

FOREIGN PATENT DOCUMENTS 8000172 5/1980 Fed. Rep. of Germany .
3441111 5/1986 Fed. Rep. of Germany .

OTHER PUBLICATIONS

"Preset Tooling", *Metalworking Production*, Jan. 30, 1963, pp. 61–71.
Nickman Wimet Advertisement, *Metalworking Production*, Jul. 7, 1965, p. 21.
*Fertigung*, 1980, p. 204.
*Maschinenmarkt, Wurzburg*, 1976, p. 86.

*Primary Examiner*—Steven C. Bishop
*Attorney, Agent, or Firm*—Toren, McGeady & Associates

[57] ABSTRACT

A precision boring tool for the machining of inner faces of bores with at least one cutting plate, supported by a bracing claw, is disclosed. The cutting plate (2) is tilted versus the plane running through the cutting edge (11) of the cutting plate (2) and the longitudinal axis (17) of the precision boring tool (1). Thus, the bracing claw (3) can be disposed such that it does not protrude into the chip space (4).

21 Claims, 4 Drawing Sheets

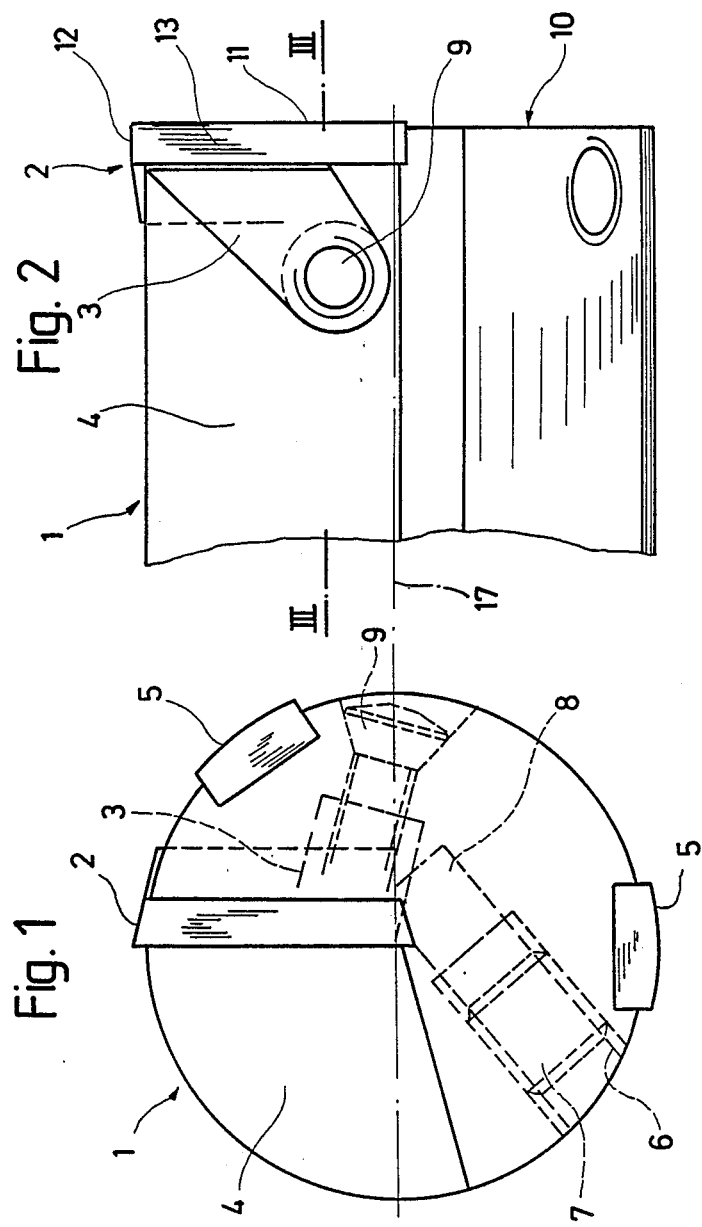

PRECISION BORING TOOL

BACKGROUND OF THE INVENTION

1. Field of the Invention

The present invention relates to precision boring tools for the inner machining of bores, with at least one cutting plate supported by a bracing claw.

2. Brief Description of the Background of the Invention Including Prior Art

Precision boring tools for the inner machining of bores are known, which include at least one cutting plate supported by at least one bracing claw. A disadvantage of these precision boring tools is associated with the protruding of the bracing claw into the chip space coordinated to the cutting plate. Thus, in particular in cases of small diameter bores, the chip removal is hindered. Because of non-removal of the chips, the surface of the bores to be machined can be damaged, the tool can be destroyed by chip jamming, or the geometry of the bore can be influenced in a negative way.

SUMMARY OF THE INVENTION

1. Purposes of the Invention

It is an object of the invention to provide a precision boring tool for obtaining bore surfaces and/or bore geometries having a high precision machining quality, where an improved chip removal is assured.

It is a further object of the present invention to provide a precision boring tool where the cutting plate is supported in such a way as to allow easy adjustment of the bore diameter without canting.

It is yet a further object of the present invention to provide a cutting plate and a bracing claw system, which allows to position the cutting plates at desired locations for complex cutting patterns.

These and other objects and advantages of the present invention will become evident from the description which follows.

2. Brief Description of the Invention

The present invention provides for a precision boring tool for an inner machining of bores. Said boring tool comprises a boring tool body having a longitudinal rotation axis, a cutting plate having a cutting edge, and a bracing claw holding the cutting plate in position against the boring tool body. The cutting plate is tilted relative to a plane running through the cutting edge of the cutting plate and through the longitudinal rotation axis of the boring tool body. Thus the cutting plate is disposed in a groove furnished in the boring tool body of the precision boring tool. The cutting plate contacts a surface, generated by the cutting edge moving with the rotating boring tool body, only with the active cutting edge.

The cutting plate can contact a plane, spanned by an outer surface of the bracing claw, only with its cutting edge. A surface of the bracing claw, which surface can be disposed remote from the cutting plate, can define a plane. Said plane can form a delimiting surface of a chip waste disposal space.

The cutting edge of the cutting plate can be disposed parallel to the longitudinal rotation axis of the boring tool body, and perpendicular to the longitudinal rotation axis of the boring tool body. The side edge of the cutting plate, constructed as a friction cutter, can be formed at least in the region of the chip space of the cutting edge as a side cutting edge. Said side edge can extend on the side of the cutting edge toward the longitudinal rotation axis of the boring tool body.

An adjustment member, supported at the boring tool body, can serve for the radially adjustable positioning of the cutting plate. The bracing claw, supporting the cutting plate, can be formed such that it can press the cutting plate additionally against the adjustment member.

A bracing screw can engage the boring tool body. The bracing claw can include a bracing lip. Said bracing lip can enclose an angle versus a plane, which can be disposed perpendicular relative to the center axis of a bore of the bracing claw, and where the bore can receive a bracing screw. The bracing lip can expand in the direction of angular advancement of the cutting plate. The bracing claw can be countersunk into the base body of the precision boring tool and can be secured against rotation.

The cutting plate can exhibit a cross-section, which can comprise essentially two trapezoids joined at their base face.

Preferably, the cutting plate includes, on the side disposed toward the bracing lip, a chip space following to the cutting edge disposed symmetrically to the center axis of the cutting plate.

The cutting plate is disposed such that it contacts a plane, spanned by an end face of the clamping or bracing claw, only with the cutting edge, which engages the surface to be machined, and the bracing claw is positioned such that the upper side of the bracing claw, facing away from the cutting plate, which upper side forms at the same time a delimiting region of the chip space, is disposed in a plane and does not protrude into the chip space. Thus, there results, even in case of small bore diameters, a large available space for the chips to be removed. Based on the improved chip removal, it is assured that the surface and the geometry of the bore, generated with the aid of the precision boring tool, are not damaged by chip jamming.

It is particularly advantageous if an embodiment is employed which serves for machining the base of a borehole. For this purpose, the cutting plate is disposed such, at the front side of the tool, that the cutting edge runs perpendicular to the longitudinal axis of the tool. The large chip space is particularly advantageous in this constellation. The cutting plate is formed as a friction cutting edge in this tool and is radially adjustable by way of an adjustment member. Not only the base of the bore can be machined in an optimum way with the aid of this tool, but also the bore wall is precisely machined. The processed and machined bore surfaces exhibit moreover fine precision machining qualities.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 1 is a front view of a precision boring tool with a cutting plate, where the cutting edge of the cutting plate is disposed perpendicular to the longitudinal axis of the tool;

FIG. 2 is a side view of the precision boring tool according to FIG. 1;

DESCRIPTION OF INVENTION AND PREFERRED EMBODIMENT

Figure 3:
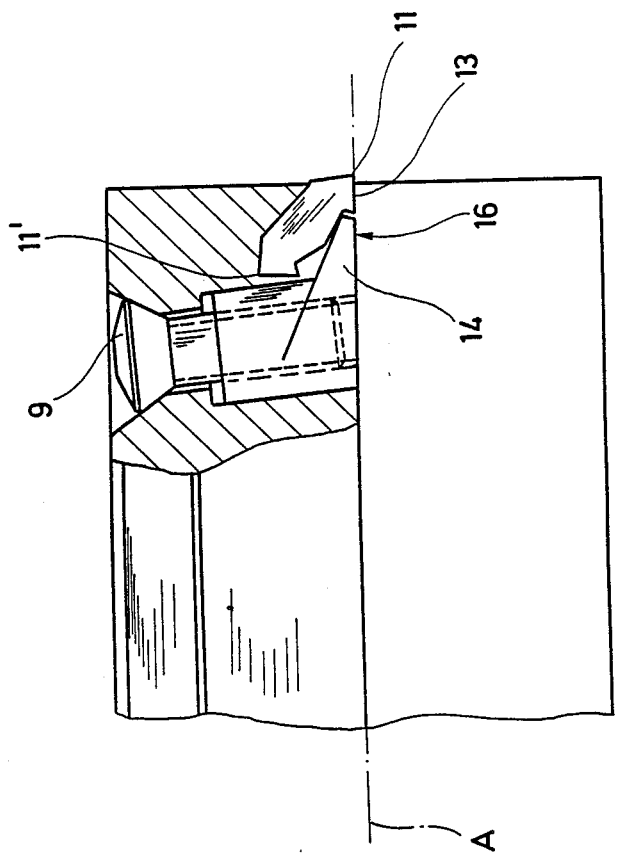
FIG. 3 is a section along the section line III—III according to FIG. 2.

In accordance with the present invention, there is provided a precision boring tool for an inner machining of bores with at least one cutting plate held by a bracing claw. The cutting plate 2 is tilted relative to the plane running throught the cutting edge 11 of the cutting plate and through the longitudinal axis of the precision boring tool and thus is disposed in a groove furnished in the base body of the precision boring tool. The cutting plate 2 contacts the plane A only with its active cutting edge 11. The surface 16 of the bracing claw 3, disposed remote from the cutting plate 2, is disposed in the plane A and forms a delimiting surface of a chip space 4.

The cutting edge 11 of the cutting plate 2b can be disposed parallel to the longitudinal axis 17 of the precision boring tool 1'. The cutting edge 11 of the cutting plate 2, 2a can be disposed perpendicular to the longitudinal axis 17 of the precision boring tool 1, 1'. The side edge of the cutting plate 2, formed as a friction cutter, can be constructed, at least in the region of the chip space 13 of the cutting edge 11, as a side cutting edge 12. The side edge can follow to that side of the cutting edge 11 disposed remote relative to the longitudinal axis 17 fo the precision boring tool 1.

Preferably, the bracing claw 3, supporting the cutting plate 2, is formed such that it presses the cutting plate 2 also against a adjustment member 7, 8. Said adjustment member can serve for the radially adjustable positioning of the cutting plate 2. The bracing lip 14 of the bracing claw 3 can enclose an angle versus the plane, which can be disposed perpendicular relative to the center axis 18 of a bore 19 of the bracing claw, where the bore 19 can receive a bracing screw 9. Preferably, the bracing lip 14 is expanded in the direction of angular advancement of the cutting plate 2. The bracing claw 3 can be countersunk into the base body of the precision boring tool and can be secured against rotation.

Preferably, the cutting plate 2 exhibits a cross-section, which comprises essentially two trapezoids joined at their base face. The cutting plate 2 can include, on the side disposed toward the bracing lip 14, a chip space 13 following to the cutting edge 11 and/or two bracing grooves 15, disposed symmetrically to the center axis of the cutting plate.

FIG. 1 illustrates a lathe tool, and in particular a precision boring tool 1, in a front view. It can be clearly recognized that the clamping or bracing claw 3, supporting the cutting plate 2, does not protrude into the chip space 4, which exhibits in this case an opening angle of about 115 degrees. The opening angle can be from 80 to 160 degrees and is preferably from 100 to 130 degrees. The bracing claw 3 is disposed countersunk in the base body of the precision boring tool. The guide strips 5 can be recognized at the circumstance of the precision boring tool, where the first strip follows the cutting plate by about 40 degrees in the rotation direction of the tool, while the second strip is disposed opposite to the cutting plate. The guide strips can extend over an angle of from about 20 to 40 degrees. The position defining contact line of the first guide strip can be at an angle of from about 30 to 70 degrees and preferably 40 to 60 degrees. The position of the defining contact line of the second guide strip can be at an angle of from about 160 to 200 degrees and preferably from about 170 to 190 degrees from the cutting edge. The surface of the guide strip is preferably cylindrical with a radius of curvature from about 0.5 to 0.9 of the radius of curvature of the boring tool at the cutting edge location and with the cylinder axis disposed parallel to the reaction axis of the tool. The cutting plate 2 is radially adjusted by an adjustment screw 7, inserted into a bore 6, via an adjustment wedge 8. The adjustment wedge 8 rests immediately at the cutting plate 2. The bracing claw 3 is supported by a bracing screw 9. The head of the bracing screw is formed conical and is supported at the base body of the precision boring tool. However, bracing screws of different construction can also be employed such as, for example, those having two oppositively running thread sections with varying slopes. The cutting plate 2 is disposed in a cutting slot or, respectively, in a groove, which is, for example, milled into the base body of the precision boring tool 1. Thus, there results an optimum guiding of the cutting plate, which is required for achieving a high precision and a precise machining quality of the processed and machined surfaces.

It can be recognized from FIG. 2 that the cutting plate 2 is formed more or less rectangular. It exhibits, in addition to a main cutting edge 11, running substantially parllel to the front side 10 of the precision boring tool 1, a side cutting edge 12, disposed substantially perpendicular to the main cutting edge, which side cutting edge 12 extends at least over the chip space 13 of the main cutting edge 11. The side cutting edge serves for a precise machining of the side walls of the bore.

The position of the cutting plate 2, which is preferably formed as a turning or reversible plate, becomes particularly clear from the sectional view of FIG. 3. It can also be recognized that the side of the cutting plate 2, disposed toward the bracing lip 14 of the bracing claw 3, exhibits two bracing grooves 15 running parallel to the center axis of the cutter. These grooves exhibit a bracing face contacting the bottom side of the bracing lip 14, where the imaginary extension of the bracing face, according to FIG. 3, intersects the center axis of the bracing screw 9 under an angle of about 120 degrees. This angle should be larger than about 95 degrees and smaller than about 150 degrees. The force exerted by the bracing lip 14 is thus split into two components. The one component acts in the direction of the cutter back, disposed opposite to the clamping or bracing groove, while the second component acts in the direction of the free face of the cutting edge 11', which is disposed opposite to the cutting edge 11. The free face is the face of the cutting plate, which intersects the chip space 13 in the cutting edge 11. The chip face and the free face, in the case of the cutting plate illustrated here, enclose an angle of about 82 degrees. The angle between chip face and free face can be from about 20 to 90 degrees and is preferably from about 75 to 85 degrees.

By splitting of the bracing force into two components, the cutting plate is held in an optimum position and is guided particularly well during the radial positional adjustment.

The cutting plate is formed as a turning or reversible plate, such that, after the wear of the cutting edge 11, the cutting edge 11' can be brought to engage with the bore wall or, respectively, with the bore base after a rotation of the cutting plate.

The cutting plate is preferably provided as a tool having a two-fold rotation axis disposed perpendicular to the plane spanned by the cutting edges 11, 11'. The distance of the cutting edges can be from about 1 to 4 times the thickness of the cutting plate, and preferably from about 2 to 3 times the thickness of the cutting plate. The cutting angles of the cutting plate can be from about 60 to 90 degrees, and are preferably from about 70 to 85 degrees. The depth of the groove can be from about 0.02 to 0.2 times the thickness of the cutting plate. The groove is preferably provided with angled planes reaching up to the two-fold rotation axis of the cutting plate. These angled surfaces are suitable for clamping or bracing. The cutting plate is preferably formed such that the two-fold axis of the cutting plate forms an angle of from about 30 to 60, and preferably from about 40 to 50, such as for example 45 degrees, with the rotation axis of the tool.

The cutting plate is also guided during the radial adjustment setting by having the bracing lip 14 of the bracing claw 3 engage into the bracing groove 15. Since the bracing claw is to be disposed countersunk in the base body of the precision boring tool, the bracing claw cannot rotate or tilt even if forces, acting on the side of the bracing lip 14, occur, such as during the radial adjustment of the cutting plate 2. This contributes also to the guiding of the cutting plate during its radial adjustment.

It can be recognized from FIG. 3 that the surface 16 of the bracing lip 14, disposed toward the chip space 4, is disposed approximately in the plane A, which runs through the cutting edge 11 of the cutting plate and through the longitudinal axis 17 of the precision boring tool 1. Here again, it can be recognized that the course of the chips in the chip space 4 is not interfered with by the bracing claw 3. The particular disposition of the bracing claw is made possible in that the active cutting edge 11 is disposed in the plane A, which runs through this cutting edge and through the longitudinal axis 17 of the precision boring tool, while the cutting edge 11' of the cutting plate, disposed opposite to the active cutting edge 11, is disposed at a distance relative to the plane A.

Figure 4:
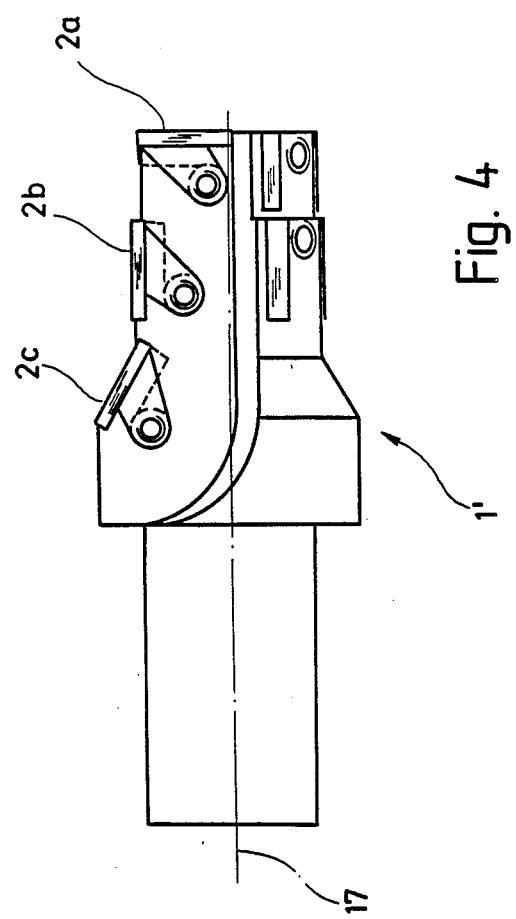
FIG. 4 is a side view of a precision boring tool with cutting plates disposed at different angles relative to the longitudinal axis of the precision boring tool.

A precision boring tool 1' with several cutting plates is illustrated in FIG. 4. In addition to the bore base, the bore wall can be machined with this tool, where, in addition, conical bore walls can be subjected to a precision machining. According to the embodiment illustrated in FIG. 4, the cutting edge of a first cutting plate 2a runs perpendicular to the longitudinal axis 17 of the precision boring tool, while the cutting edge of a second cutting plate 2b runs parallel to the longitudinal axis. The cutting edge of a third cutting plate 2c runs at an angle of about 30 degrees as illustrated relative to the longitudinal axis 17 of the precision boring tool 1'. The angle of the cutting edge of the third or any addition cutting plate can be varied as desired.

Figure 5:
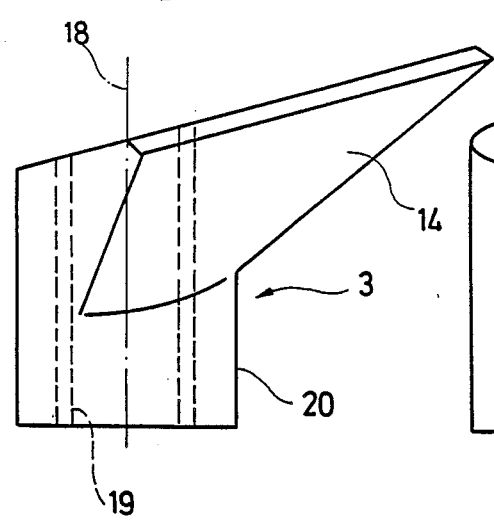
FIG. 5 is a side view of a bracing claw.
Figure 6:
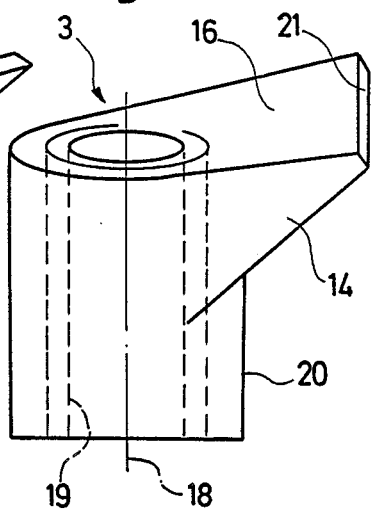
FIG. 6 is a perspective view of the bracing claw according to FIG. 5.
Figure 7:
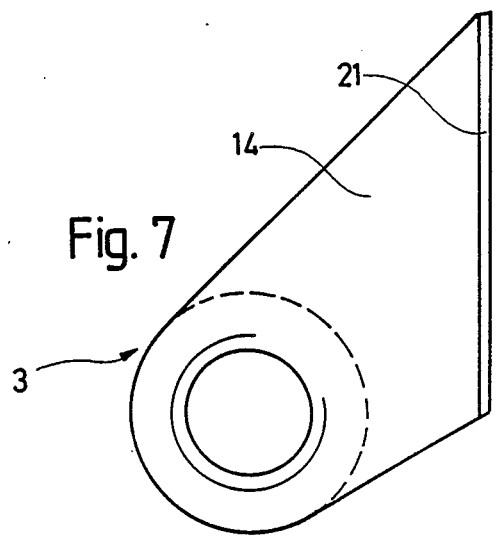
FIG. 7 is a top plan view of the bracing claw according to FIG. 5.

The bracing claw 3 is illustrated in more detail in FIGS. 5, 6, and 7. It can be recognized in FIG. 5 that the surface 16 of the bracing lip 14 is disposed at an angle versus the center axis 18 of the bore 19. In the present case, an angle of 10 degrees is illustrated. The angle can be from about 5 to 25 degrees, and preferably from 8 to 15 degrees. It is further recognizable in this illustration that the bracing claw 3 includes a guide pin 20, which engages into a corresponding bore in the base body of the precision boring tool 1, 1' and which contributes to an improved support of the bracing claw 3 in the base body of the precision boring tool.

The perspective view of FIG. 6 illustrates that the surface 16 of the bracing lip 14 forms an angle of from about 5 to 20 degrees, and of preferably about 10 degrees, versus the center axis 18 of the bore 19. In addition to this inclination, the bracing lip is rotated. This rotation results from the fact that the front side edge 23 of the bracing lip 14, illustrated in FIG. 6, exhibits a smaller inclination angle as compared to the rear side edge 22, illustrated in FIG. 6.

The bracing lip 14 is provided on its front face with a bezel 21, which can have an angle of from about 30 to 60 degrees, and preferably from about 40 to 50 degrees, such as, for example, 45 degrees, versus the surface 16.

The bracing lip expands, according to FIG. 7, in the direction to its front face, where the side edges 22, 23 of the bracing lip include an angle of from about 5 to 20 degrees, and preferably about 10 degrees. The side edge 22 of the bracing lip is inclined, according to FIG. 7, by about 10 to 50 degrees, and preferably by 20 to 40 degrees such as, for example, 30 degrees, versus the vertical. The side edge 23 includes with the front edge of the bracing lip 14 an angle of from 30 to 60 degrees, and preferably from 40 to 50 degrees such as, for example, 45 degrees, and the side edge 23 includes with the front edge an angle of from about 110 to 150 degrees, such as for example 125 degrees.

The clamping or bracing claw is preferably a body without symmetry axis. The part of the bracing body is made of a tubular piece having a threaded center bore forming a cylindrical section. The diameter of the center bore can be from about 0.3 to 0.7 times the diameter of the cylindrical section and is preferably from about 0.4 to 0.6 tims the diameter of the outer diameter of the cylindrical section. The cylindrical section is extended by a bracing lip disposed staggered relative to the cylindrical section. The bracing lip edge forms a straight line and extends in a direction perpendicular to the axis of the cylindrical part and is preferably provided by a bezel. The extension of the bracing lip edge can be from about 1.2 to 1.8 times the diameter of the cylindrical part, and is preferably from about 1.4 to 1.6 times the diameter of the cylindrical part. The distance of the bezel 21 from the center axis of the cylindrical part can be from about 0.5 to 1.5 and preferably from about 0.9 to 1.1 times the diameter of the cylindrical part from the axis of the cylinder. One end of the bracing lip edge is disposed, within a perpendicular projection of the cylinder onto the edge, and preferably within the perpendicular projection of the cylinder bore onto the bracing lip edge such as, for example, at the point of perpendicular projection of the center axis of the cylindrical part onto the bracing lip edge. The second end of the bracing lip edge has a distance from the projection of the center axis onto the bracing lip edge, which can be from about 1.5 to 2 times the diameter of the cylindrical part. The bracing lip can form, with the surface 16, an angle of from about 5 to 20 degrees, and preferably 10 degrees relative to the center axis 18 of the cylindrical part. The support surface at the bottom on the opposite side to the face 16 of the bracing lip can form an angle of from about 30 to 60 degrees, and preferably 40 to 50 degrees with the axis of the cylindrical part. The side faces between the faces 16 and its opposite counterpart run preferably from the cutting edge tangentially joining the cylindrical part.

The bracing claw, illustrated in FIGS. 5 to 6, is particularly suited for the bracing of cutting plates at the front face of the precision boring tool. As illustrated in FIG. 2, the cutting plate is formed as a friction cutter, that means it exhibits a side cutting edge 12 at the radius of the precision boring tool, which runs approximately parallel to the surface to be processed and runs practically perpendicular to the cutting edge 11. The cutting edge of the side cutting edge exhibits an inclination decreasing from the front side of the precision machining tool toward its shaft. The maximum inclination amounts to about 1 micrometer per 1 millimeter. The wear of the side cutting edge is balanced by radially adjusting the cutting plate with the aid of the adjustment screw 7 and of the adjustment wedge 8.

In order to assure an improved support for the cutting plate, the bracing lip 14 of the bracing claw 3 is inclined or, respectively, turned, according to FIG. 5, such that the cutting plate is also pressed against the adjustment wedge 8. The expansion of the bracing lip 14 serves in particular for supporting the cutting plate 2 in such a way that, during the radial adjustment, there is excluded a tilting motion, which could change the inclination angle of the side cutting edge 12. In addition, the bracing groove 15 and the cutter slot also contribute that the cutting plate is supported and guided in an improved manner. Finally, it is prevented that the inclination angle of the side cutting edge 12 changes during the radial adjustment of the cutting plate 2 by having the bracing claw 3 secured against rotation and turning by its countersunk disposition in the base body of the precision boring tool. This results in a very high precision and in an excellent surface quality of the bore to be machined.

The bracing groove 15 is formed such that the bracing force, exerted by the bracing lip 14 onto the cutting plate 2, is split. There result two press-on faces joined to each other.

The cutting plate 2 is pressed on the one hand with its back 13', and on the other hand, with the free face 13" of the cutting edge 11' against the base body of the precision boring tool. Thus, the cutting plate is supported in an improved way in the precision boring tool.

It can be recognized in particular from FIG. 3 that the precision boring tool is also suitable for the inner machining of bores with small diameters, because the cutting plate is formed very flat. Thereby, there results a large chip space.

It will be understood that each of the elements described above, or two or more together, may also find a useful application in other types of machining tools differing from the types described above.

While the invention has been illustrated and described as embodied in the context of a precision boring tool for the interior machining of bores, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A precision boring tool for an inner machining of bores comprising
    a boring tool body having a longitudinal roation axis;
    a cutting plate having a cutting edge;
    a bracing claw holding the cutting plate in position against the boring tool body, wherein the cutting plate is tilted relative to a plane running through the cutting edge of the cutting plate and through the longitudinal rotation axis of the boring tool body, and thus the cutting plate is disposed in a groove furnished in the boring tool body of the precision boring tool, wherein the cutting plate contacts a surface, generated by the cutting edge moving with the rotating boring tool body, only with the active cutting edge.

2. The precision boring tool according to claim 1 wherein the cutting plate contacts a plane, spanned by an outer surface of the bracing claw, only with its cutting edge.

3. The precision boring tool according to claim 1 wherein a surface of the bracing claw, which surface is disposed remote from the cutting plate, defines a plane and wherein this plane forms a delimiting surface of a chip waste disposal space.

4. The precision boring tool according to claim 1, wherein the cutting edge of the cutting plate is disposed parallel to the longitudinal rotation axis of the boring tool body.

5. The precision boring tool according to claim 1, wherein the cutting edge of the cutting plate is disposed perpendicular to the longitudinal rotation axis of the boring tool body.

6. The precision boring tool according to claim 5, wherein the side edge of the cutting plate, constructed as a friction cutter, is formed at least in the region of the chip space of the cutting edge as a side cutting edge, which side edge extends on the side of the cutting edge toward the longitudinal rotation axis of the boring tool body.

7. The precision boring tool according to claim 5 further comprising
    an adjustment member supported at the boring tool body, wherein the adjustment member serves for the radially adjustable positioning of the cutting plate, and wherein the bracing claw supporting the cutting plate, is formed such that it presses the cutting plate additionally against the adjustment member.

8. Precision boring tool according to claim 7 further comprising
    a bracing screw engaging the boring tool body, wherein the bracing claw includes a bracing lip, which bracing lip encloses an angle versus a plane, which is disposed perpendicular relative to the center axis of a bore of the bracing claw, and where the bore receives a bracing screw.

9. The precision boring tool according to claim 8, wherein the bracing lip is expanded in the direction of angular advancement of the cutting plate.

10. Precision boring tool according to claim 1, wherein the bracing claw is countersunk into the base body of the precision boring tool and is secured against rotation.

11. The precision boring tool according to claim 1, wherein the the cutting plate exhibits a cross-section, which comprises essentially two trapezoids joined at their base face.

12. The precision boring tool according to claim 11, wherein the cutting plate includes, on the side disposed toward the bracing lip, a chip space following to the cutting edge disposed symmetrically to the center axis of the cutting plate.

13. A precision boring tool for an inner machining of bores with at least one cutting plate held by a bracing claw, wherein the cutting plate (2) is tilted relative to a plane running through the cutting edge (11) of the cutting plate and through the longitudinal axis of the precision boring tool and thus is disposed in a groove furnished in the base body of the precision boring tool, wherein the cutting plate (2) contacts the plane (A) only with its active cutting edge (11), and where the surface (16) of the bracing claw (3), disposed remote from the cutting plate (2), is disposed in the plane (A) and forms a delimiting surface of a chip space (4).

14. The precision boring tool according to claim 13, wherein the cutting edge (11) of the cutting plate (2b) is disposed parallel to the longitudinal axis (17) of the precision boring tool (1').

15. The precision boring tool according to claim 13, wherein the cutting edge (11) of the cutting plate (2, 2a) is disposed perpendicular to the longitudinal axis (17) of the precision boring tool (1, 1').

16. The precision boring tool according to claim 14, wherein the side edge of the cutting plate (2), formed as a friction cutter, is constructed, at least in the region of the chip space (13) of the cutting edge (11), as a side cutting edge (12) and wherein the side edge follows to that side of the cutting edge (11) disposed remote relative to the longitudinal axis (17) of the precision boring tool (1).

17. The precision boring tool according to claim 15, wherein the bracing claw (3), supporting the cutting plate (2), is formed such that it presses the cutting plate (2) also against a adjustment member (7, 8), which adjustment member serves for the radially adjustable positioning of the cutting plate (2); and wherein the bracing lip (14) of the bracing claw (3) encloses an angle versus the plane, which is disposed perpendicular relative to the center axis (18) of a bore (19) of the bracing claw, where the bore (19) receives a bracing screw (9).

18. The precision boring tool according to claim 17, wherein the bracing lip (14) is expanded in the direction of angular advancement of the cutting plate (2).

19. The precision boring tool according to claim 13, wherein the bracing claw (3) is countersunk into the base body of the precision boring tool and is secured against rotation.

20. The precision boring tool according to claim 13, wherein the cutting plate (2) exhibits a cross-section, which comprises essentially two trapezoids joined at their base face; and wherein the cutting plate (2) includes, on the side disposed toward the bracing lip (14), a chip space (13) following to the cutting edge (11), disposed symmetrically to the center axis of the cutting plate.

21. The precision boring tool according to claim 13, wherein the cutting plate (2) exhibits a cross-section, which comprises essentially two trapezoids joined at their base face; and wherein the cutting plate (2) includes, on the side disposed toward the bracing lip (14), a chip space (13) following to two bracing grooves (15), disposed symmetrically to the center axis of the cutting plate.

* * * * *